United States Patent [19]

Rudich, Jr.

[11] 4,070,610
[45] Jan. 24, 1978

[54] PROPORTIONAL MOTOR CIRCUIT
[75] Inventor: George Rudich, Jr., Goshen, Ind.
[73] Assignee: Johnson Controls, Inc., Milwaukee, Wis.
[21] Appl. No.: 649,946
[22] Filed: Jan. 19, 1976
[51] Int. Cl.$^2$ .............................................. G05F 1/00
[52] U.S. Cl. ................................... 318/678; 318/624; 318/641
[58] Field of Search ............... 318/641, 624, 676, 678; 324/98, 99 R; 323/68; 236/13, 78 C; 307/297, 230, 235 T

[56] References Cited
U.S. PATENT DOCUMENTS

| | | | |
|---|---|---|---|
| 3,523,228 | 8/1970 | Currie et al. | 318/678 |
| 3,560,829 | 2/1971 | Brennan | 318/599 |
| 3,686,557 | 8/1972 | Futamura | 318/599 |
| 3,806,789 | 8/1974 | Cap et al. | 318/678 X |
| 3,975,669 | 8/1976 | Tyler | 318/624 |

Primary Examiner—B. Dobeck
Assistant Examiner—John J. Feldhaus
Attorney, Agent, or Firm—Emrich, Root, O'Keeffe & Lee

[57] ABSTRACT

A proportional motor control circuit for supplying bidirectional drive to a motor as a function of variations of a sensed parameter includes a temperature sensing amplifier which is responsive to an error signal indicative of deviations of the parameter from a set point to provide an output signal representing the direction and amount of the deviation, and a pair of operational amplifiers, each of which serves as a load for the other amplifier, which are responsive to the signal output of the temperature sensing amplifier to determine the polarity of the energizing potential applied to a D.C. motor over motor drive circuits. The motor control circuit is described with reference to an application in an environmental control system to effect positioning of dampers located in air ducts for supplying heated or cooled air to an area in response to changes in the air temperature in the area.

16 Claims, 2 Drawing Figures

PROPORTIONAL MOTOR CIRCUIT

BACKGROUND OF THE INVENTION

1. Field of the Invention.

This invention relates to motor control circuits, and more particularly, to a proportional motor control circuit which controls the direction of rotation of the motor shaft as a function of changes in a sensed parameter.

2. Description of the Prior Art.

Motor control circuits are employed in analog control systems for controlling a motor which controls system apparatus to maintain a variable system parameter at a predetermined set point value. The motor control circuit responds to an input signal representing deviations of the parameters from the set point to supply drive signals to the motor, which controls apparatus of the system to correct for the error.

By way of example, the motor control circuit may be used in environmental control systems to control the energization of a motor which drives a damper actuator which controls the mixing dampers located in the air ducts supplying warm and cool air to an area or room. The damper actuator is driven by the motor to position the dampers as a function of the temperature in the area as sensed by a temperature sensor. The motor effects repositioning of the dampers to permit warm or cool air to be supplied to the area as needed to compensate for changes in temperature.

In such applications, a reversible motor is generally required to permit opening and closing of the dampers. Thus, the motor control circuit must provide bi-directional drive to the motor to compensate for positive or negative deviations from the set point. Bi-directional drive is generally provided through the use of first and second level detectors which control the motor in response to changes in error signal, indicative of variations in temperature, relative to a reference signal as may be provided by a follow-up potentiometer driven by the motor. One of the level detectors responds to an increase in the error signal relative to the reference indicative of an increase in temperature to enable as associated drive circuit to apply a positive energizing potential to the motor. The other level detector responds to a decrease in the error signal relative to the reference indicative of a decrease in temperature to enable an associated drive circuit to apply a negative energizing potential to the motor. The level detectors operate independently of one another and have respective positive and negative turnon thresholds established by the supply voltage which energizes the control circuit. Thus, proper operation of the circuit is dependent upon balancing of the circuit to provide equivilant positive and negative threshold levels for the level detectors and upon maintaining a constant supply voltage output. For example, assuming the level detectors are initially set to provide symmetrical operation for a given supply voltage, then should the supply voltage decrease for any reason, the sensitivity of one of the level detectors may increase while that of the other level detector may decrease. Such condition is undesirable in environmental control systems wherein the temperature should be maintained at the set point value and, in the event of a change, the temperature should be returned to the set point quickly.

Therefore, it would be desirable to have a motor control circuit for providing bi-directional drive to a motor and which responds quickly to correct for deviations of the system parameter from the set point.

SUMMARY OF THE INVENTION

It is therefore an object of the present invention to provide a motor control circuit for a control system which provides linear bi-directional drive for a motor as a function of deviations of a system parameter from a set point value.

Another object of the invention is to provide a motor control circuit for a control system which is insensitive to variations in supply voltage.

Yet another object of the invention is to provide a control circuit for a control system including first and second differential detecting means operatively connected to provide control outputs indicative of increases or decreases in an error signal supplied to one of the differential detecting means.

These and other objects are achieved by the present invention which has provided in a control system, a control circuit responsive to an input signal indicative of a condition being monitored for providing first and second control outputs indicating an increase or a decrease, respectively, in the input signal. The control circuit comprises sensing means responsive to said input signal to provide an error signal which varies in amplitude and polarity in accordance with changes in the condition being monitored, first differential detecting means responsive to said error signal and a first reference signal to provide a first output signal at an output thereof, second differential detecting means responsive to said first output signal and a second reference signal to provide a second output signal at an output thereof, first switching means enabled in response to the output signals provided by said first and second detecting means in response to a predetermined increase in said error signal to provide said first control output, and second switching means enabled in response to the output signals provided by said first and second detecting means in response to a predetermined decrease in said error signal to provide said second control output.

Thus, in accordance with the present invention, wherein first and second differential detecting means are employed to control switching means to provide control outputs indicative of an increase or decrease in an error signal, one of the differential detecting means controls the operation of the other differential detecting means thereby effecting a more stable response to changes in the error signal.

In one embodiment, the first and second differential detecting means include respective first and second differential amplifier means, and a load means interconnects outputs of the first and second differential amplifier means.

The common load means connected between the outputs of said first and second differential amplifier means permits the first differential amplifier means to source current to the load means and the second differential amplifier means to sink current from the load means in response to an increase in the error signal, and permits the second differential amplifier means to source current to the load means and the first differential amplifier means to sink current from the load means in response to a decrease in the error signal. The direction of current flow over the load means is thus indicative of the variation in the error signal.

In accordance with an exemplary embodiment, the control circuit is used to supply drive signals to a motor which controls apparatus of the system to maintain a system parameter at a set point value. The direction of rotation of a shaft of the motor is controlled in accordance with deviations of the system parameter from the set point value. The first switching means is enabled in response to current flow over the load means in one direction to apply an energizing voltage of one polarity to the motor, causing the motor shaft to be rotated in one direction. The second switching means is enabled in response to current flow over the load means in the opposite direction to apply an energizing voltage of the opposite polarity to the motor, causing the motor shaft to be rotated in the opposite direction.

A reference means supplies the first reference signal to the first differential amplifier means, and when the motor is energized, the reference means is controlled by the motor to vary the reference signal to offset the error signal and thus effect the deenergization of the motor when the control apparatus has been adjusted to correct for the change in the system parameter.

A feedback means connected between outputs of the first and second switching means and an output of the first differential amplifier means provides a hysteresis which enables the first and second switching means to maintain the motor energized until the reference signal offsets the error signal.

In accordance with a feature of the invention, the output signal levels of the control circuit, as well as the reference signals, are derived as a ratio of the supply voltage, the signal levels increasing or decreasing from a reference level in response to variations in the error signal. Accordingly, the control circuit is substantially insensitive to variations in the supply voltage. Moreover, the control circuit allows bidirectional operation of a D.C. motor with a single ended power supply.

In the disclosed embodiment, wherein the reference means comprises an actuator or follow-up potentiometer, the desired sensitivity and hysteresis is accurately maintained across the full stroke of the actuator. Also, when the circuit is at null, that is, when the motor is not running, the current draw of the circuit is only the quiescent current of operational amplifier circuits which comprise the sensing means and the differential amplifier means.

DESCRIPTION OF A PREFERRED EMBODIMENT

Figure 1:
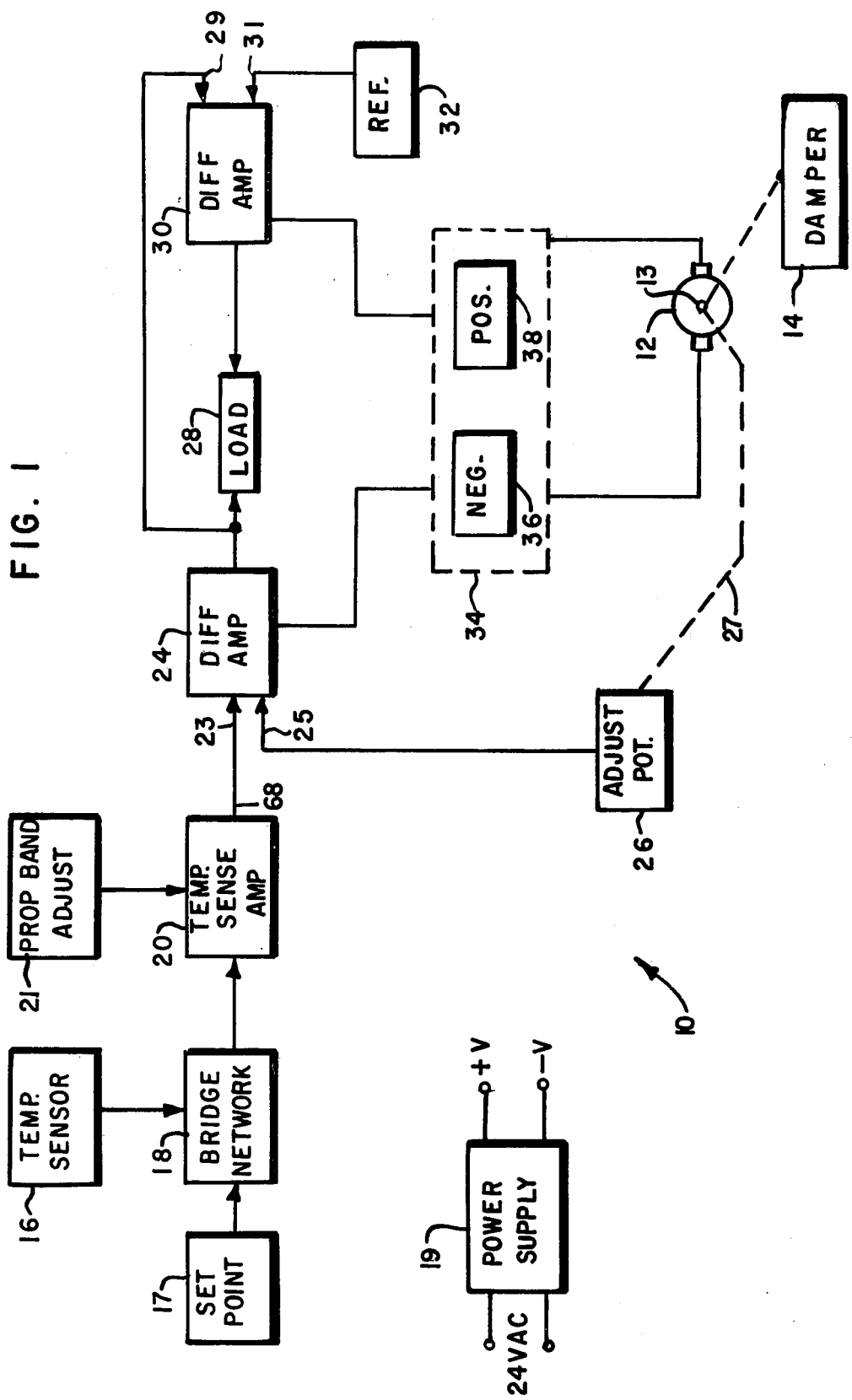
FIG. 1 is a block diagram of a proportional motor control circuit provided by the present invention.

Referring to the drawings, FIG. 1 is a block diagram of a proportional motor control circuit 10 provided by the present invention. The motor control circuit 10 provides bidirectional on-off drive for a reversible D.C. motor 12 as a function of deviations of a sensed parameter from a system set point. By way of illustration, the control circuit 10 is described with reference to an application in an environmental control system to supply drive to a motor 12 for controlling a damper apparatus 14 which is operable to control the flow rate of hot and cold air supplied to an area or a room.

The damper apparatus 14 includes a damper actuator (not shown) which controls the positioning of a pair of dampers (not shown) which may be located in heating and cooling air ducts, respectively, which supply conditioned air to the area. A temperature sensor 16, which is located in the area, provides a command signal to the control circuit 10 to permit repositioning of the hot and cold air dampers in accordance with senses temperature changes in the area, to maintain the temperature in the area at a desired value.

As shown in FIG. 1, the motor control circuit 10 includes a temperature sensing network 18, including the temperature sensor 16, which provides an output or error signal indicative of deviations of the temperature in the area from a set point value. The error signal is extended to a temperature sensing amplifier 20 which provides an output signal proportional to the sensed temperature.

Whenever the temperature in the area is near the set point, as established by setpoint network 17, the amplitude of the signal output of the amplifier 20 is normally at a level intermediate the potential provided at outputs $+V$ and $-V$ of a power supply circuit 19 which energizes the control circuit 10. Whenever the temperature in the area decreases, the output signal of the amplifier 20 increases toward $+V$, and whenever the temperature in the area increases, the output signal decreases toward $-V$. A proportional band adjust network 21 connected to the amplifier 20 provides proportional band adjustment for the control circuit 10.

The signal output of the temperature sensing amplifier 20 is supplied to an input 23 of a differential amplifier 24, which has a second input 25 connected to an actuating potentiometer 26 which provides a reference signal indicative of the position of the dampers. The actuating potentiometer 26 is mechanically linked to the shaft 13 of the motor 12, as indicated by the dashed line 27, and when the motor 12 is energized, the actuating potentiometer 26 is driven by the motor shaft 13 in a direction to vary the amplitude of the reference signal to thereby compensate for the increase or decrease in the error signal supplied to the differential amplifier 24.

In response to an increase or decrease in the output of the temperature sensing amplifier 20 relative to the reference signal provided by the actuating potentiometer 26, the differential amplifier 24 is operable to provide an output representing such change to a load 28 and to an input 29 of further differential amplifier 30, which has a second input 31 connected to a reference source 32. The differential amplifiers 24 and 30 control the enabling of a motor drive circuit 34 which includes a pair of drive circuits 36 and 38 which are selectively enabled in accordance with the polarity of the error signal to provide drive for the DC motor 12, to effect rotation of the motor shaft 13 in opposite directions.

The load 28, interconnecting the outputs of amplifiers 24 and 30 permits each of the amplifiers 24 and 30 to serve as a load for the other amplifier, the direction of current flow over the load, determines the polarity of the drive voltage applied to the motor 12. When the signal levels at the inputs of differential amplifier 24 are equal, the signal levels at the outputs of amplifier 24 and 30 are maintained at ½ the supply voltage, and there is no current flow to the load 28. For a decrease in the potential at input 23 of amplifier 24, the output of amplifier 24 increase causing a corresponding decrease in the output of amplifier 30, and the amplifiers 24 and 30 cause drive circuit 36 to be enabled to denergize the motor 12 effecting rotation of the motor shaft 13 in one direction to reposition the associated dampers. As the motor shaft 13 rotates, the actuating potentiometer 26 is controlled to decrease the signal level at input 25 of amplifier 24 until the potential at input 25 equals the potential at input 23. At such time, amplifiers 24 and 30 effect deenergization of the motor 12.

In response to the increase in the potential at input 23 of amplifier 24, the output of amplifier 24 decreases causing a corresponding increase in the output of amplifier 30 and the amplifiers 24 and 30 are capable to cause drive circuit 38 to be enabled to energize the motor 12 effecting rotation of the motor shaft 13 in the opposite direction, and the actuating potentiometer 26 is driven to provide an offset voltage at input 25 of amplifier 24, to effect deenergization of the motor. As the temperature in the area returns to the set point in response to operation of the dampers, the signal output of amplifier 20 approaches the mid-point of the potential between outputs +V and −V, thus increasing (or decreasing) relative to the potential provided by the actuating potentiometer 26, and the amplifiers 24 and 30 reenable the motor 12 to return the dampers to the normal positions and to deenergize the motor 12 when the set point is reached. As will be shown, negative feedback is provided from the drive circuits 34 to the differential amplifier circuits 24 and 30 to assure sufficient compensation for the deviation and to prevent overshooting of the set point.

DETAILED DESCRIPTION

Figure 2:
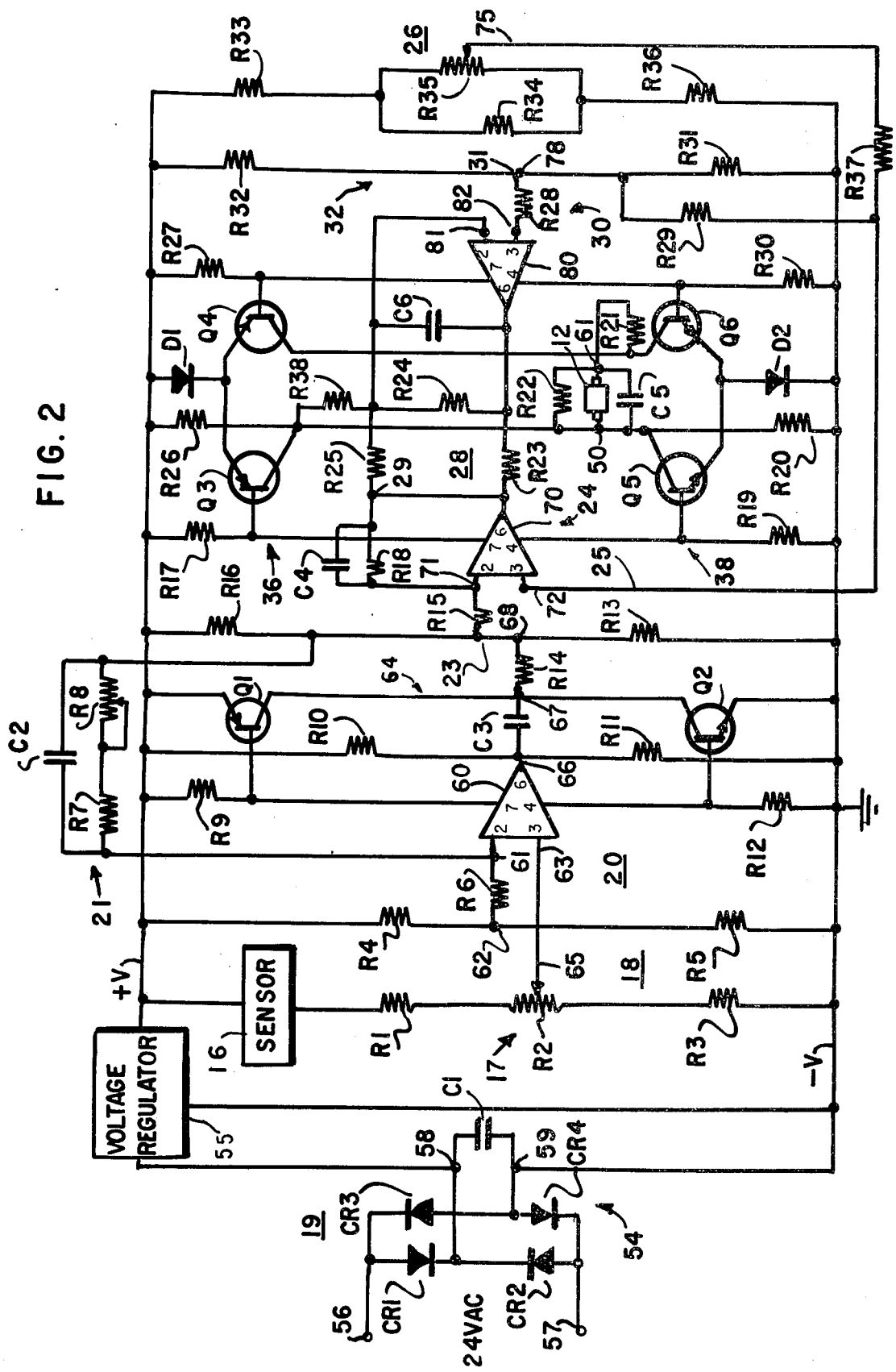
FIG. 2 is a schematic circuit diagram for the motor control circuit shown in FIG. 1.

Referring to FIG. 2, which is a schematic circuit diagram for the motor control circuit 10, the power supply circuit 19 comprises a full-wave bridge rectifier stage 54, including diodes CR1-CR4, and filter capacitor C1, and a regulator circuit 55, such as the type 7824UC, commercially available from Fairchild Semiconductor. The rectifier stage 54 has a pair of input terminals 56 and 57 connected to a 24-volt A.C. source and a pair of output terminals 58 and 59 connected to the voltage regulator circuit 55, which provides a regulated voltage at 24 volts D.C. between conductors +V and −V. In the exemplary embodiment, conductor +V is at 24 volts D.C. and conductor −V serves as a ground reference potential.

The temperature sensing network 18 comprises resistors R1–R5, connected to form a bridge network to which the temperature sensor 16 is connected. The temperature sensor 16 may, for example, comprise the type T91 Room Temperature Sensing Element, commerically available from Penn Controls Division of Johnson Controls Inc.

Resistors R1–R3 and the temperature sensor 16 are connected in a first series circuit between conductor +V and ground, and resistors R4 and R5 are connected in a second series circuit between conductor +V and ground. The sensor 16 incorporates a highly sensitive thermistor sensing element (not shown) that responds immediately to a temperature change providing a change in resistance of the thermistor. The sensor 16 is connected in one leg of the bridge network 18 such that variations in the resistance of the thermistor cause an unbalanced condition for the bridge network 18, providing a D.C. output voltage which is extended to the temperature sensing amplifier 20.

The amplifier 20 comprises a high-gain amplifier 60 and an output driver stage 64 including transistors Q1 and Q2. The amplifier 60, which for example, may be the Type 741 Operational Amplifier, commercially available from Fairchild Semiconductor, is connected in a non-inverting configuration and serves to provide amplification of the error signal provided by the bridge network 18. Amplifier 60 has a first input 61 at pin 2 connected over a resistor R6 to the junction 62 of resistors R4 and R5. A second input 63 at pin 3 of the amplifier 60 is connected directly to a wiper 65 of potentiometer R2 of the bridge network 18. Amplifier 60 has a positive bias input at pin 7 connected over resistor R9 to conductor +V, and a negative bias input at pin 4 connected over resistor R12 to conductor −V. The output 66 of the operational amplifier 60 at pin 6 is connected to the junction of resistors R10 and R11, which are serially connected between conductors +V and −V, and is coupled over capacitor C3 and resistor R14 to an output of the amplifier circuit 20 at point 68. When the sensed temperature is at the set point, the output 66 of amplifier 60 is maintained at +12VDC by resistors R10 and R11.

Negative feedback is provided for the amplifier circuit 20 by the proportional band adjust network 21 which includes feedback resistor R7 and a potentiometer R8 which are connected in series between the output of the amplifier circuit 20 at point 68, and input 61 of the operational amplifier 60. Potentiometer R8 provides the proportional band adjust for the control circuit 10. A capacitor C2, which is parallel with resistors R7 and R8 provides enough roll-off to prevent unwanted AC pickup and noise from being amplified and injected into the rest of the control circuit 10.

The bridge network 18 is balanced by adjusting wiper 65 of potentiometer R2 such that the voltage at the output 68 of amplifier circuit 20 is 12 volts DC, or one-half the potential difference between conductors +V and −V. Any increase or decrease in the resistance of the temperature sensor 16 causes an unbalance in the bridge network thereby varying the D.C. potential supplied to inputs 61 and 63 of the amplifier 60, causing a resulting increase or decrease in the output signal at point 68.

Transistors Q1 and Q2, which may be the types 2N3703, and 2N3705, respectively, form a power drive circuit for the amplifier circuit 20 to provide current to point 67 and over resistor R14 to output terminal 68 for positive and negative going signals, respectively. Transistor Q1 has an emitter conneced to conductor +V and a collector connected to point 67. The base of transistor Q1 is connected over resistor R9 to conductor +V. Transistor Q2 has an emitter connected to ground and a collector connected to point 67. The base of transistor Q2 is connected over resistor R12 to ground.

Transistors Q1 and Q2 have a low saturation voltage which allows their respective collectors at point 67 to swing very near the level 24 VDC and ground as a function of current draw of amplifier 60 via bias terminals (pins 7 and 4, which causes current flow over resistors R9 and R12, controlling the level of conductivity of transistors Q1 and Q2.

The output of the drive stage 64 is a signal proportional to the sensed temperature and swings from ground to 24 volts in accordance with variations in the error signal supplied to amplifier 20 over the bridge network 18. The change in temperature required to provide the full swing is determined by resistors R4 and R5, which establish a voltage divider network at input 61 of the amplifier 60, and resistors R6–R8 which establish the gain for amplifier 60.

The output of the temperature sensing amplifier 20 at point 68 is connected over resistor R16 to conductor −V and over resistor R13 to conductor −V. The voltage swing at the junction 68 of resistors R16 and R13 is determined by the voltage divider formed by resistors R13 and R14, and R16. Resistors R13, R14 and R16 are precision resistors, such as one percent evaporated metal film resistors, so that the voltage swing at point 68 is precise fraction of the power supply voltage, and is centered at one half of the power supply voltage, or +12 volts DC when the bridge network 18 is in a balanced condition.

Differential amplifier 24 comprises an operational amplifier 70, such as the Fairchild Semiconductor Type 741. One input 71, at pin 2 is connected over a resistor R15 to input 23 of the differential amplifier 24 which is connected to the output of the temperature sensing amplifier 20 at point 68. A second input 72 of amplifier 70 at pin 3 is connected over resistor R37 to the wiper 75 of the actuating potentiometer 26, and over a resistor R29 which is connected to the junction at point 78, of resistors R31 and R32 which are connected in series between conductors +V and −V. The potentiometer 26 has a resistance portion R35 connected in series with resistors R33 and R36 between conductors +V and −V. A resistor R34 is connected parallel with the resistance R35 forming a voltage divider which provides voltage across resistance R35 which is 1.167 times the voltage swing available at the junction 68 of resistors R16 and R13. This is done to provide a 1.5 inch stroke, for the potentiometer 26, corresponding to the 1.5 inch stroke for the motor 12, while the effective length of resistance R35 is 1.75 inches. This leaves approximately 0.125 inches at each end of the resistance R35 to ensure that the offset voltage of amplifier 20 does not prevent a balanced condition from being reached.

The gain of the amplifier 24 is determined by resistor R15 and a resistor R18, since resistor R15 is assumed to be equal to resistor R37 and resistor R18 is assumed to be equal to resistor R29, which is connected between the output of the amplifier 70 and the input of the amplifier 70. The gain of amplifier 24 may, for example, be 47. A capacitor C4, which is connected in parallel with resistor R18, provides a roll-off for the amplifier 70 to eliminate amplification of the motor noise.

Amplifier 70 has a positive bias terminal at pin 7 connected over a resistor R17 to conductor +V and a negative bias terminal at pin 4 connected over a resistor R19 to ground.

The output of amplifier 70 at pin 6 is extended to an input 29 of differential amplifier 30, which is comprised of an operational amplifier 80, such as the Fairchild Semiconductor Type 741 connected in an inverting configuration. The amplifier 80 has an input 81 at pin 2 connected over resistor R25 to input 29, and a second input 82 at pin 3 connected over a resistor R28 to the junction 78 of resistors R32 and R31 which comprise the reference circuit 32. Resistors R31 and R32 are connected as a voltage divider between conductors +V and −V, providing a reference voltage at +12 VDC to the differential amplifier 30.

The gain of amplifier 80, typically on the order of −0.47, is determined by resistor R25 and a resistor R24, which is connected between the output of the amplifier 80 at pin 6 and input 81 of the amplifier 80. Amplifier 80 has a positive bias terminal at pin 7 connected over a resistor R27 to conductor +V and a negative bias terminal at pin 4 connected over a resistor R30 to ground.

A resistor R23, which comprises load 28, is connected between the outputs of amplifiers 70 and 80 and serves as a common load for the amplifiers 70 and 80.

The differential amplifier circuits 24 and 30 control the selective enabling of motor drive circuits 36, comprised of transistors Q3 and Q6, and motor drive circuit 38, comprised of transistors Q4 and Q5, which are individually operable to supply energizing drive potentials of opposite polarities to terminals 50 and 51 of the motor 12. The motor 12 is a very slow drive type such as a Barber-Colman FYQM series D.C. reversible motor equipped with a reduction gearing coupled to a worm gear linked to the damper appratus 14. The motor 12 has a one and half-inch stroke from full in to full out position. The direction of movement of the motor shaft 13 is determined by the polarity of the drive applied to the motor 12 by the motor drive circuit 34.

Referring to motor drive circuits 36 and 38, transistor Q3 has its base connected to the junction of resistor R17 and the positive bias input (pin 7) of amplifier 70 and its collector connected to terminal 50 of the motor 12 and over resistor R26 to conductor +V. Transistor Q6 has its collector connected over a resistor R21 to terminal 51 of the motor 12 and its base connected to the junction of resistor R30 and the negative bias terminal (pin 4) of amplifier 80. Resistor R21 limits the peak starting current drain of the motor 12 and also allows use of different voltage motors by varying the valve of resistor R21.

Similarly, transistor Q4 of drive circuit 38 has its base connected to the junction of resistor R27 and the positive bias input (pin 7) of amplifier 80, and its collector connected over resistor R21 to terminal 51 of the motor 12. Transistor Q5 has its base connected to the junction of resistor R19 and the negative bias input (pin 4) of amplifier 70, and its collector connected to terminal 50 and over resistor R20 to ground. A resistor R22, and a capacitor C5, are connected in parallel with the motor winding between terminals 50 and 51 thereof and serve to limit motor noise.

A resistor R38, which is connected between the collector of transistor Q3 and input 81 of amplifier 80, along with resistor R25 provide a hysteresis to assure that the motor drive circuit 36 (or circuit 38) remains enabled until the set point is reached, thereby avoiding hunting by the motor 12 for a balanced condition for the bridge network 18.

Diode D1 which is connected from conductor +V to the emitters of transistors Q3 and Q4, and diode D2, which is connected from the emitters of transistors Q5 and Q6 to conductor +V establish a reference threshold for transistors Q3-Q6 to eliminate the possiblity of simultaneous conduction of transistors Q3 and Q4 or Q5 and Q6, as may result from quiescent current levels of amplifiers 70 and 80.

OPERATION

When the temperature in the controlled area is at or near the set point value, the bridge network 18 is balanced such that the error signal is zero and the output of the temperature sensing amplifier 20 at point 68 is at +12 volts. Also, the potentials at inputs 71 and 72 of amplifier 70 are equal so that the output of amplifier 70 is equal to one-half the supply voltage which causes the inputs 81 and 82 of amplifier 80 to be at one-half the supply voltage since resistors R31 and R32 are equal. Thus, the output of amplifier 80 is also at one-half the supply voltage and there is no current flow to the load resistor R23. Accordingly, for such conditions, transistors Q3-Q6 of the drive circuits 36 and 38 are all cut off and the motor 12 is deenergized.

When the air temperature of the area decreases above the set point value, the resistance of the thermistor, which has a negative temperature coefficient, increases causing a decrease in the potential at input 63, of amplifier 60, so that input 61 of the amplifier 60 is at a higher voltage than input 63. This causes the output of the amplifier 60 at point 66 to decrease from the 12 volt reference potential as the amplifier 60 sinks current to ground. This causes the current flow to the negative bias input (pin 4) to increase above its quiescent level thereby increasing the voltage drop across resistor R12 which forward biases the base-emitter junction of transistor Q2 and causes the voltage at point 67, the junction of resistor R14, and the collectors of transistors Q1 and Q2 to decrease. This in turn causes the voltage at the output of the temperature sensing amplifier 20 at point 68 to decrease.

When the voltage at output 68 decreases, the voltage at input 71 (pin 2) of amplifier 70 becomes less than the voltage at the other input 72 (pin 3) of the amplifier 70 so that the output of the amplifier 70 increases. The output of amplifier 70 is extended over resistor R25 to input 81 of amplifier 80 so that input 81 is at a higher voltage than input 82 of the amplifier 80. Accordingly, the output of amplifier 80 decreases. Thus, amplifier 70 sources current for the load resistor R23, and amplifier 80 sinks the current for the load resistor R23.

The increased output current from amplifier 70 cause the voltage across resistor R17 to increase, and the increased current supplied to amplifier 80 causes the voltage across resistor R30 to increase. As the voltage at input 71 (pin 2) of amplifier 70 decreases, the voltage across resistor R17 increases until transistor Q3 starts to conduct. This increases the voltage at the collector of transistor Q3, and this voltage is coupled to input 81 of amplifier 80 through resistor R38, forcing the output of amplifier 80 to decrease until both transistor Q3 and transistor Q6 become saturated.

When transistors Q3 and Q6 saturate, terminal 50 of the motor is connected to conductor +V over transistor Q3 and diode D1 and terminal 51 of the motor 12 is connected to conductor −V over current limiting resistor R21, transistor Q6 and diode D2.

When the motor 12 is energized, the motor shaft 13 is rotated driving the damper actuator 14 (FIG. 1) to modulate the warm and cold air dampers located in air ducts which supply conditioned air to the area such that the warm air damper is driven towards the fully open position while the cold air damper is driven towards the fully closed position, thereby increasing the amount of warm air supplied to the area to increase the temperature in the area.

The rotation of the motor shaft 13 is mechanically coupled to the actuating potentiometer R35 so that the voltage at the wiper 75 of the potentiometer R35 decreases causing the output voltage of amplifier 70 to decrease. The output of amplifier 70 must decrease to a point equal to one-half the power supply voltage, due to the hysteresis provided by resistors R25 and R38, before the voltage is removed from the drive motor 12. At this point the motor 12 stops, and wiper 75 of the actuating potentiometer 26 is positioned such that inputs 71 and 72 of amplifier 70 are at the same voltage.

As the temperature in the area begins to increase, such temperature change is sensed by the temperature sensor 16 with the resistance of the thermistor element decreasing, causing the bridge network 18 to return to a balanced condition. Accordingly, as the error signal approaches zero, the signal output of the temperature sensing amplifier 20 increases and the output at point 66 approaches the 12 volt reference level. Also, the signal output of the amplifier 20 at point 68 increases toward +12 volts. Accordingly, the output of amplifier 70 decreases causing the output of amplifier 80 to increase whereby amplifier 80 sources current to load resistor R23, and amplifier 70 sinks current from the load resistor R23. This causes transistors Q4 and Q5 to be saturated whereby a reverse potential is applied to the motor 12 effecting rotation of the motor shaft 13 in the opposite direction to return the warm and cool air dampers to the normal positions.

A similar operation results for an increase in temperature in the area which causes an increase in the output of the temperature sensing amplifier 20 so that input 71 of amplifier 70 is at a higher voltage than input 72 of amplifier 70 except that transistors Q4 and Q5 are turned on and voltage of the opposite polarity is applied to the drive motor 12. This reverses the motor direction such that the cool air damper is driven towards the fully open position and the warm air damper is driven towards the fully closes position thereby increasing teh amount of cool air supplied to the area to decrease the temperature in the area.

Transistors Q4 and Q5 are cut off, deenergizing the motor 12 when the signal supplied to input 72 of amplifier 70 offsets the signal supplied to input 71 by the temperature sensing amplifier. Thereafter, as the temperature in the area returns to the set point value, transistors Q3 and Q6 are enabled to return the dampers to the normal positions at which time transistors Q3 and Q6 are cut off, deenergizing the motor 12.

The following is a list of values for capacitors C1–C6 and resistors R1–R37 employed in an exemplary embodiment, However, the component values are provided merely by way of example and are not intended as a limitation on the scope of the invention.

| Resistors | |
|---|---|
| R1 | 1.2K ohms |
| R2 | 200 ohms potentiometer |
| R3 | 3.3K ohms |
| R4,R6 | 2K ohms |
| R5 | 750 ohms |
| R7 | 6.8K ohms |
| R8 | 35K ohms potentiometer |
| R9 | 180 ohms |
| R10,R11 | 1.6K ohms |
| R12 | 180 ohms |
| R13,R16,R33,R36 | 1.13K ohms |
| R14 | 5.11K |
| R15,R20,R26,R28,R31,R32,R37,R25 | 10K ohms |
| R17,R19,R27,R30 | 150 ohms |
| R18,R29 | 470K ohms |
| R21 | 100 ohms |
| R22 | 1K ohms |
| R23 | 470 ohms |
| R24 | 4.7K ohms |
| R34 | 316 ohms |
| R35 | 5K ohms potentiometer |
| Capacitors | |
| C1 | 220 microfarads |
| C2,C5,C6 | .47 microfarads |
| C3 | .047 microfarads |
| C4 | .15 microfarads |

I claim:

1. In a control system, a control circuit responsive to an input signal indicative of a condition being monitored for providing first and second control outputs indicating an increase or a decrease, respectively, in said input signal, said control circuit comprising sensing means responsive to said input signal to provide an error signal which varies in amplitude and polarity in accordance with changes in the condition being monitored, first differential detecting means responsive to said error signal and a first reference signal to provide a first output signal at an output thereof, second differential detecting means responsive to said first output signal and a second reference signal to provide a second output signal at an output thereof, first switching means coupled to at least said first detecting means and enabled thereby to provide said first control output whenever the output signals provided by said first and second detecting means indicate a predetermined increase in said error signal, said second switching means coupled to at least said second detecting means and enabled thereby to provide said second control output whenever the output signals provided by said first and second detecting means indicate a predetermined decrease in said error signal.

2. A control system as set forth in claim 1 which includes load means connected between respective first and second outputs of said first and second detecting means to permit current flow from the output of one of said detecting means over said load means and the other one of said detecting means in response to an increase in said error signal, and to permit current flow from the output of said other detecting means over said load means and said one detecting means in response to a decrease in said error signal.

3. In a control system, a control circuit responsive to an input signal indicative of a condition being monitored for providing first and second control outputs indicating an increase or a decrease, respectively, in said input signal, said control circuit comprising sensing means responsive to said input signal to provide an error signal which varies in amplitude and polarity in accordance with changes in the condition being monitored, first differential detecting means having a first input connected to an output of said sensing means to receive said error signal, and a second input connected to an output of a first reference source means to receive a first reference signal, said first differential detecting means being responsive to said error signal and said first reference signal to provide a first output signal at an output thereof, second differential detecting means having a first input connected to said output of said first differential detecting means to receive said first output signal, and a second input connected to an output of a second reference source means to receive a second reference signal, said second differential detecting means being responsive to said first output signal and said second reference signal to provide a second output signal at an output thereof, load means connected between said outputs of said first and second detecting means to permit one of said detecting means to source current to said load means and the other of said detecting means to sink current from said load means in response to an increase in said error signal, and to permit said other detecting means to source current to said load means and said one detecting means to sink current from said load means in response to a decrease in said error signal, first switching means enabled in response to the output signals provided by said first and second detecting means in response to a predetermined increase in said error signal to provide said first control output, and second switching means enabled in response to the output signals provided by said first and second detecting means in response to a predetermined decrease in said error signal to provide said second control output.

4. In a control system, a control circuit responsive to an input signal indicative of a condition being monitored, for providing first and second control outputs indicating an increase or a decrease, respectively, in said input signal, said control circuit comprising sensing means responsive to said input signal to provide an error signal at an output thereof which varies in amplitude and polarity in accordance with changes in the condition being monitored, differential detecting means including first and second differential amplifier means, load means connected between respective first and second outputs of said first and second differential amplifier means, said first differential amplifier means being responsive to an increase in said error signal to provide current flow from said first output over said load means and said second differential amplifier means, said second differential amplifier means being responsive to a decrease in said error signal to provide current flow from said second output over said load means and said first differential amplifier means, and output means including first and second switching means controlled by said differential detecting means to provide said first and second control outputs in accordance with the direction of current flow over said load means, said first switching means being enabled to provide said first control output in response to current flow over said load means in one direction, and said second switching means being enabled to provide said second control output in response to current flow over said load means in the opposite direction.

5. A control system as set forth in claim 4 including voltage source means for energizing said control circuit, and circuit means connected to said voltage source means for providing reference voltage levels proportional to the output of said voltage source means at least at said outputs of said first and second differential amplifier means and said sensing means to enable said control circuit to operate at signal levels which are proportional to the output of said voltage source means.

6. In a control system including a motor having a shaft connected to apparatus of the system for controlling said apparatus to maintain a system parameter at a set point value, a sensing device for monitoring the parameter, and a motor control circuit responsive to the sensing device to supply bi-directional drive signals to the motor in response to changes in the value of the parameter relative to a set-point value as sensed by the sensing device, said motor control circuit comprising sensing means controlled by said sensing device to provide an error signal which varies in accordance with changes in said parameter, first differential detecting means responsive to said error signal and a first reference signal to provide a first control output, second differential detecting means responsive to said first control output and a second reference signal to provide a second control output, and output means including first switching means coupled to and controlled by at least one of said differential detecting means for applying an energizing signal of one polarity to said motor whenever the difference between said first and second control outputs indicates a predetermined increase in the error signal relative to said first reference signal, and second switching means coupled to and controlled by at least the other one of said differential detecting means for applying an energizing signal of the opposite polarity to said motor whenever the difference between said first and second control outputs indicates a predetermined decrease in the error signal relative to said first reference signal.

7. A control system as set forth in claim 6 which includes load means connected between respective first and second outputs of said first and second detecting means to permit current flow from the output of one of said detecting means over said load means and the other of said detecting means in response to an increase in said error signal, and to permit current flow from the output of said other detecting means over said load means and said one detecting means in response to a decrease in said error signal.

8. A control system as set forth in claim 7 wherein said first detecting means includes first differential amplifier means having a first input connected to said output of said sensing means to receive said error signal, and a second input connected to an output of a first reference source means to receive said first reference signal, and wherein said second detecting means includes second differential amplifier means having a first input connected to said output of said first differential amplifier means to receive said first output signal and a second input connected to a second reference source means to receive said second reference signal.

9. A control system as set forth in claim 8 wherein first reference source means is controlled by said motor to vary said first reference signal in accordance with rotation of the motor shaft to offset said error signal to effect the deenergization of said motor.

10. A control system as set forth in claim 7 wherein said first switching means is controlled by said first and second detecting means in response to said predetermined increase in said error signal to connect said energizing signal of said one polarity to said motor to effect rotation of said motor shaft in one direction, and said second switching means is controlled by said first and second detecting means in response to said predetermined decrease in said error signal to connect said energizing signal of the opposite polarity to said motor to effect rotation of the motor shaft in the opposite direction.

11. A control system as set forth in claim 9 wherein said output means includes feedback means connected between outputs of said first and second switching means and an output of said first detecting means for controlling said first and second switching means to maintain said motor energized until said first reference signal offsets said error signal.

12. In a control system including a motor having a shaft connected to apparatus of the system for controlling said apparatus to maintain a system parameter at a set point value, a sensing device for monitoring the parameter, and a motor control circuit responsive to the sensing device to supply drive signals to the motor in response to changes in the value of the parameter relative to a setpoint value as sensed by the sensing device, said motor control circuit comprising sensing means controlled by said sensing device to provide an error signal which varies from a reference value in accordance with changes in said parameter, differential detecting means including first and second differential amplifier means, said first differential amplifier means having a first input connected to an output of said sensing means to receive said error signal, and a second input connected to an output of a first reference source means to receive a first reference signal, said first differential amplifier means providing a first output signal at an output thereof which varies with changes in said error signal, and said second differential amplifier means having a first input connected to said output of said first differential amplifier means to receive said first output signal, and a second input connected to a second reference source means to receive a second reference signal, said second differential amplifier means providing a second output signal at an output thereof which varies with changes in said first output signal, and thus said error signal, load means interconnecting said output of said first differential amplifier means and said output of said second differential amplifier means, the output signals provided by said differential amplifier means in response to an increase in said error signal causing current to flow over said load means in one direction, and the output signals provided by said differential amplifier means in response to a decrease in said error signal causing current to flow over said load means in the opposite direction, and output means including first and second drive means controlled by said first and second differential amplifier means for energizing said motor to drive said motor shaft in respective first and second directions as a function of the direction of current flow over said load means.

13. A control system as set forth in claim 12 which includes bias means connected to said first and second amplifier means, for normally maintaining outputs of said first and second amplifier means at a reference level and for enabling the output of one of said amplifier means to decrease from said reference level in response to an increase in said error signal relative to one of said reference signals and enabling the output of the other one of said amplifier means to increase relative to said reference level.

14. A control system as set forth in claim 13 wherein said bias means includes means for normally maintaining said output of said sensing means at said reference level, the output of said sensing means varying in accordance with changes in said parameter.

15. A control system as set forth in claim 14 wherein in said bias means includes source means for providing an energizing voltage for energizing said control circuit, said reference level being proportional to the amplitude of said energizing voltage.

16. A control system as set forth in claim 13 wherein said first reference source means is controlled by said motor to vary said first reference signal in accordance with rotation of said the motor shaft to offset said error signal causing the output of said first amplifier means to be returned to said reference level, and wherein said output means includes feedback means connected to outputs of said first and second drive means for extending a feedback signal to said output of said first amplifier means for maintaining said motor energized until the output of said first amplifier means is returned to said reference level.

* * * * *